Jan. 14, 1930.                G. C. ENGSTRAND                1,743,762
                              OIL PUMPING APPARATUS
                              Filed Feb. 18, 1927
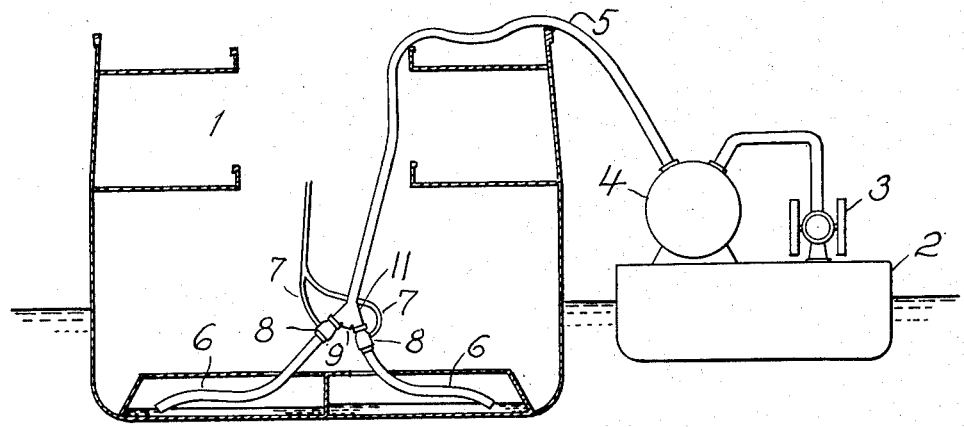
FIG. 1
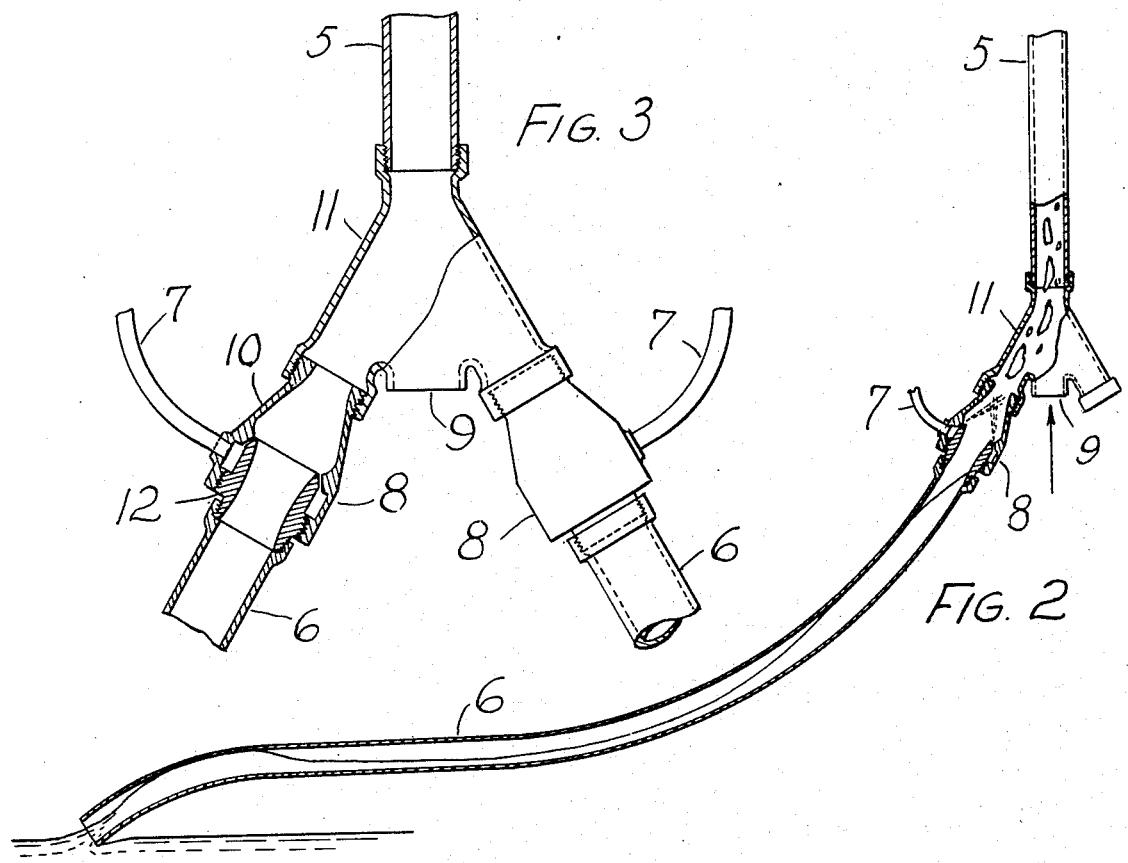
WITNESSES.                                            INVENTOR.
                                                  Gunnar C. Engstrand
                                              BY
                                                        ATTORNEY.

Patented Jan. 14, 1930

1,743,762

UNITED STATES PATENT OFFICE

GUNNAR C. ENGSTRAND, OF BROOKLYN, NEW YORK, ASSIGNOR TO SALVAGE PROCESS CORPORATION, OF NEW YORK, N. Y., A CORPORATION OF NEW YORK

OIL-PUMPING APPARATUS

Application filed February 18, 1927. Serial No. 169,204.

My invention relates to an apparatus and method for the pumping of heavy viscous oils and material and is especially adapted for the cleaning of double bottoms of maritime vessels.

It has for its object to provide an open suction line into which a plurality of separate feed lines enter.

It has also for its object to provide the feed lines with adjustable steam ejectors at the entrance into the open suction line.

It has also for its object to provide substantially horizonal feed lines into which air is admitted at the intake end in sufficient quantities to cause a wave transmission in the horizontal lines.

In the drawings:—

Figure 1 shows the general arrangement for the pumping of the double bottom of a maritime vessel.

Figure 2 shows the detail construction of the lower part of the transmission line with one feed line attached and illustrates in a diagrammatic manner the wave transmission of the material through the feed line.

Figure 3 shows the detail of construction of the steam ejectors and the air intake of the main transmission line.

In the drawing where like reference characters designate identical parts, 1 represents the maritime vessel from which the viscous material is withdrawn. At the side of the vessel the barge 2 is moored, on the deck of which the vacuum pump 3 is mounted. The suction from the vacuum pump is connected to the collector tank 4 into which the main suction line 5 discharges.

The hose 5 is shown slung over the ship side and is at its inboard end provided with a Y connection 11 to which the horizontal feed lines 6 are connected by means of the adjustable steam ejectors 8.

The Y connection is also provided with an open intake through which the atmospheric air is allowed to enter.

The steam ejectors 8 comprise in combination a socket part 10 into which the nozzle part 12 is screwed. These parts are so constructed that they together form an annular nozzle through which the steam from the steam line 7 will enter into the transmission.

The operation is as follows:—

The vacuum pump, having been strated, takes out the air from the collector tank and free atmospheric air will rush in through the open line 5 to make up the deficiency in the tank 4.

It is to be noted that the open line 5 prevents a high vacuum in the collector tank and the volume of air rushing in through the intake 9 is several times the volume of air that rushes in through the air openings in an apparatus as per the U. S. Patent No. 1,405,173. It is also to be noted that the air entrance through the open inlet 9 is not accompanied by a temperature reduction as is the case of the pumping rig shown in the U. S. Patent No. 1,480,482 where the air expands into a line where a high vacuum is maintained.

The carrying capacity of an air stream is in direct proportion to the density of the air and also to the square of the velocity. Therefore it is of the utmost importance to maintain a high velocity as well as density inside the transmission line.

With an open suction line into which the material is fed by independent feed lines several times more of material can be transferred than with a vacuum suction line which is employed in the pumping apparatus shown in the above mentioned patents, where the material is sucked up and emulsified by the vacuum in the hose.

The steam jets 8 are made up of two parts which are screwed together. The deeper the male part 12 is screwed into the socket 10 the more is the jet opening contracted and it is a simple matter to properly adjust the steam jet for the particular material to be handled.

The vacuum required for the transmission through the short feed lines is relatively low and the material is readily sucked up into the suction line by the relatively low vacuum which the steam jets 8 are able to create.

In this connection it is to be noted that the jet nozzle is sharply inclined towards the axis of the transmission line. The steam will therefore emit in shape of a conical sheet which entirely shuts off the entire hose line.

I have noticed that if the steam emits from nozzles parallel with the transmission line the created vacuum is slight as the air tends to pass back around the jets.

Also, by placing the steam jets where the feed lines enter the main suction line, the pumped material will be blown into fragments which are readily carried by the air stream to the collector tank.

The transmission through the horizontal feed line is illustrated in Figure 2. The material is sucked up, into the horizontal hose line which will always remain partly filled during pumping. The air which passes over the surface of the liquid material will cause waves inside the hose which waves are blown into fragments into the main suction line by the steam jets, all as shown in Figure 2.

I do not wish to be understood as limiting myself to the specific details of construction as it is manifest that variations and modifications may be made in the adaptation of the device to various conditions without departing from the spirit and scope of my invention.

I claim:—

1. In a transmission line, suction producing means connected thereto, feed lines connected to the transmission line, an air inlet in the transmission line substantially at the union of the feed lines and the transmission line, and annular steam jets near said inlet comprising a socket part into which a male nozzle part is screwed, the two parts forming a conical nozzle so directed that the steam jets will effectively shut off the transmission line below said air inlet.

2. The method of transferring viscous material through a conduit from a lower to a higher level, comprising creating a suction in said conduit and freely admitting air to said conduit at a point spaced from the inlet end thereof to create a high velocity air stream in said conduit between said point and the discharge end of said conduit, creating waves of viscous material inside the remainder of said conduit by means independent of said suction producing means, and discharging said waves into the portion of the conduit having the high velocity air stream so as to blow said waves into fragments in said air stream.

3. In a device of the character described, a suction line having an open end, a substantially horizontal feed line and a steam jet interposed between said feed line and said suction line to discharge into said suction line near the open end thereof.

4. In a device of the character described, a suction line having an end open to the atmosphere, a plurality of feed lines connected thereto and steam jets interposed between said feed lines and said suction line to discharge into said suction line near the open end thereof, said jets opening into said suction line at an oblique angle to said line.

GUNNAR C. ENGSTRAND.